US 6,574,749 B1

(12) United States Patent
Parsons

(10) Patent No.: US 6,574,749 B1
(45) Date of Patent: Jun. 3, 2003

(54) RELIABLE DISTRIBUTED SHARED MEMORY

(75) Inventor: Eric W. Parsons, Ashton (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/429,712

(22) Filed: Oct. 29, 1999

(51) Int. Cl.[7] .............................................. G06F 11/00
(52) U.S. Cl. ..................... 714/15; 711/163; 707/201
(58) Field of Search ............................ 714/15, 20, 49; 711/147, 163; 709/312; 710/200; 707/201

(56) References Cited

U.S. PATENT DOCUMENTS

| | | | | |
|---|---|---|---|---|
| 5,226,143 A | * | 7/1993 | Baird et al. ................. | 711/112 |
| 5,860,126 A | * | 1/1999 | Mittal ......................... | 711/141 |
| 5,991,893 A | * | 11/1999 | Snider ......................... | 714/11 |
| 6,009,426 A | * | 12/1999 | Jouenne et al. ............... | 707/8 |
| 6,301,676 B1 | * | 10/2001 | Kumar et al. ................. | 714/11 |
| 2002/0023129 A1 | * | 2/2002 | Hsiao et al. .................. | 709/205 |

OTHER PUBLICATIONS

Michel Dubois et al., Memory Access Buffering in Multiprocessors, 1986, pp. 320–328.
Brian N. Bershad et al., The Midway Distributed Shared Memory System, 1993, pp. 528–537.
Pete Keleher et al., TreadMarks: Distributed Shared Memory on Standard Workstations and Operating Systems, 1994, pp. 115–131.
Sarita V. Adve et al., Shared Memory Consistency Models: A Tutorial, 1996, pp. 66–76.

* cited by examiner

Primary Examiner—Robert Beausoleil
Assistant Examiner—Marc Duncan

(57) ABSTRACT

In implementing a reliable distributed shared memory, a weak consistency model is modified to ensure that all vital data structures are properly replicated at all times. Write notices and their corresponding diffs are stored on a parameterizable number of nodes. Whenever a node (say the primary node) releases a lock, it sends its current vector timestamp, write notices generated during the time the lock was held and their corresponding diffs to a secondary node. The secondary nodes keeps this information separate from its own private data structures. If a node fails (detected by all nodes simultaneously through a group membership protocol) while holding a lock, then all nodes complete a lock release method, and enter a recovery operation. During this recovery operation, all nodes exchange all write notices and corresponding diffs, including backup write notices and diffs held by nodes on behalf of the failed node. After all information has been exchanged, diffs are applied and all nodes may start fresh.

10 Claims, 7 Drawing Sheets

RELIABLE DISTRIBUTED SHARED MEMORY

FIELD OF THE INVENTION

The present invention relates to distributed shared memory and, in particular, a method for replicating state to result in reliable distributed shared memory.

BACKGROUND OF THE INVENTION

Distributed Shared Memory (DSM) has been an active field of research for a number of years. A variety of sophisticated approaches have been developed to allow processes on distinct systems to share a virtual memory address space, but nearly all of this work has been focussed on enabling shared memory based parallel scientific applications to be run on distributed systems. Examples of such scientific applications appear in computational fluid dynamics, biology, weather simulation and galaxy evolution. In studying such parallel systems, the principal focus is on achieving a high degree of performance.

While the domain of parallel scientific applications is important, distributed shared memory can also play a valuable role in the design of distributed applications. The rapid adoption of distributed object frameworks (e.g., CORBA and Java RMI) is leading to an increased number of distributed applications, whose functionality is partitioned into coarse-grained components which communicate through object interfaces. These distributed object frameworks are well suited for locating and invoking distributed functionality, and may transparently provide "failover" capabilities, failover being the capability of a system to detect failure of a component and to transfer operations to another functioning component. Many distributed applications, however, require the ability to share simple state (i.e., data) across distributed components, for which distributed shared memory can play a role.

To illustrate the need for the ability to share simple state across distributed components, consider a typical web-based service framework which allows new services to be readily added to the system. Some components of the framework deal with authenticating the user, establishing a session and presenting the user with a menu of services. The services are implemented as distinct distributed components, as are the various components of the framework itself In this type of system, a user-session object, encapsulating information about a user's session with the system, would represent simple state that must be available to every component and which is accessed frequently during the handling of each user request. If such a user-session object were only accessible through a remote interface, obtaining information such as the user's "customer-id" would be very expensive. Ideally, the usersession object would be replicated on nodes where it is required, and a session identifier would be used to identify each session.

As soon as data replication is considered, data consistency becomes an issue. There are a number of approaches that can be used for this purpose. As just mentioned, a typical starting point is to store shared objects on a single server and use remote object communication to access various fields. When performance is important, one will typically introduce caching mechanisms to allow local access to certain objects whenever possible. In practice, ad hoc caching and consistency schemes are used for this purpose, individually tailored for each object in question. Given the complexity and ensuing maintainability issues, such steps are not undertaken lightly.

Distributed shared memory (DSM), however, is ideally suited to this problem domain. Using "weak consistency" DSM techniques, state can be very efficiently replicated onto nodes where it is required, with very little additional software complexity. When an object is first accessed on a node, its data pages are brought onto the local processor and subsequent accesses occur at memory access speeds. An underlying DSM layer maintains consistency among the various copies.

Weak consistency refers to the way in which shared memory that is replicated on different nodes is kept consistent. With weak consistency, accesses to synchronization variables are sequentially consistent, no access to a synchronization variable is allowed to be performed until all previous writes have completed everywhere and no data access (read or write) is allowed to be performed until all previous accesses to synchronization variables have been performed (see M. Dubois, C. Scheurich, and F. Briggs, "Memory Access Buffering in Multiprocessors," International Symposia on Computer Architecture 1986, pp. 434–442., incorporated herein by reference).

Since existing DSM research has been focussed on parallel scientific computation, there are a number of issues that have not been addressed. First, existing DSM systems typically assume that all the nodes and processes involved in a computation are known in advance, which is not true of most distributed applications. Second, many existing DSM systems are not designed to tolerate failures, either at the node level or the application level, which will almost certainly occur in any long-running distributed application. Third, distributed applications will often have several processes running on a given node, which should be taken into account in the design of the DSM system. Finally, distributed applications have a much greater need for general-purpose memory allocation and reclamation facilities, when one is not dealing with fixed-sized multidimensional arrays allocated during application initialisation (which is typical of scientific applications).

In addition, DSM systems can be augmented to be fault tolerant by ensuring that all data is replicated to a parameterizable degree at all times. Although doing so leads to some level of overhead (on write operations), this cost may be warranted for some types of data and may still provide much better performance than storing data in secondary storage (via a database). By using a fault-tolerant DSM system for all in-memory critical data, a distributed application can easily be made to be highly available. A highly available system is one that continues to function in the presence of faults. However, unlike most fault-tolerant systems, failures in a highly available system are not transparent to clients.

Traditional in-memory data-replication schemes include primary site replication and active replica replication. In primary site replication, read and write requests for data are made to a primary (or master) site, which is responsible for ensuring that all replicas are kept consistent. If the primary fails, one of the replicas is chosen as the primary site. In active replica replication, write requests for data are made to all replica sites, using an algorithm that ensures that all writes are performed in the same order on all hosts. Read requests can be made to any replica.

Adapting a DSM system for fault tolerance is quite different than traditional in-memory data replication schemes in that the set of nodes replicating data are the ones that are actively using it. In the best case, where a single node is the principal accessor for an object and where the majority of memory operations are read operations (a read-mostly object) performance using distributed lock leasing algorithms approaches that of a local object. A distributed lock leasing algorithm is an algorithm that allows one node among a set of nodes to acquire a "lock" on a unit of shared memory for some period of time. A lock is an example of a synchronization variable since it synchronizes the modification of a unit of memory, i.e. ensures the unit is only modified by one processor at a time. If a node should fail while holding a lock, the lock is reclaimed and granted to some other node in such a way that all correctly functioning nodes agree as to the state of the lock. Read-mostly objects that are actively shared amongst several nodes may be more costly as more lock requests will involve remote communications. Most expensive may be highly shared objects that are frequently modified.

Some alternative approaches to introducing fault tolerance have been to make the DSM "recoverable", that is, allowing the system to be recovered to a previous consistent checkpoint in the event of failure. This approach is very well suited to long running parallel scientific applications, where the loss of a partial computation can be costly. However, in the context of an interactive (e.g., web-based) application, recovering to an outdated previous state provides no benefit. As such, a distributed shared memory system that offers transactional-like guarantees is desirable.

SUMMARY OF THE INVENTION

A weak consistency shared memory model is modified to result in reliable distributed shared memory that ensures that all vital data structures are properly replicated at all times. Whenever a node records changes to a unit of shared memory according to a weak consistency protocol, the node sends to a secondary node vital data structures related to that change.

In accordance with an aspect of the present invention there is provided, at a first node in a distributed shared memory system, the system implemented using the lazy release consistency protocol a method of replicating state including completing access to a synchronization variable, and, after completing the access, sending a message to a second node. The message includes an indication of a global ordering of access to the synchronization variable, an indication that a page of shared memory has undergone a modification, the page of shared memory including memory referenced by the synchronization variable and a record of the modification.

In accordance with an aspect of the present invention there is provided, at a first node in a distributed shared memory system, the system implemented using a weak consistency protocol, a method of replicating state including releasing a lock on a unit of shared memory and after releasing the lock, sending a message to a second node. The includes a vector timestamp, a write notice indicating that a page of shared memory underwent a modification while the lock was held and a record of the modification.

In accordance with a further aspect of the present invention there is provided a computer data signal including an indication of a global ordering of access to the synchronization variable, an indication that a page of shared memory has undergone a modification, the page of shared memory including memory referenced by the synchronization variable and a record of the modification.

In accordance with another aspect of the present invention there is provided a method for synchronization variable managing in a distributed shared memory system, the system implemented using a weak consistency protocol, the method including receiving an access request related to a synchronization variable, where the synchronization variable is for a unit of shared memory, determining a most recent node to have held the synchronization variable. If the most recent node to have held the synchronization variable has failed, and the failure has occurred subsequent to sending a replication message, the method further includes determining a node possessed of the replication message, the replication message including an indication of a global ordering of access to the synchronization variable, an indication that a page has undergone a modification while the synchronization variable was held, the page of shared memory including memory referenced by the synchronization variable, and a record of the modification. The method also includes forwarding the access request to the node determined to be possessed of the replication message. In a further aspect of the invention a processor, in a node manager, for carrying out this method is provided. In a still further aspect of the invention a software medium permits a general purpose computer to carry out this method.

In accordance with another aspect of the present invention there is provided, at a first node in a group of nodes in a distributed shared memory system implemented using a weak consistency protocol, a method of recovering from a failure of a second node in the group including detecting, via a group membership protocol, the failure in the second node, releasing each currently held synchronization variable, waiting for each currently held synchronization variable to be released or expire and entering a recovery operation. The recovery operation includes sending, to all nodes in the group, an indication of a global ordering of access to each synchronization variable along with an indication of each page that has undergone a modification while one synchronization variable was held, and a record of the modification, receiving from other nodes in the group a plurality of indications of global ordering of access to each synchronization variable currently held by other nodes, each indication of global ordering sent with an indication of each page that has undergone a modification while one synchronization variable was held, and a record of the modification and, subsequent to completion of the sending and receiving, applying each the received record to a shared memory.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate an example embodiment of this invention.

DETAILED DESCRIPTION OF THE PREFERRED EMBODIMENTS

Figure 1:
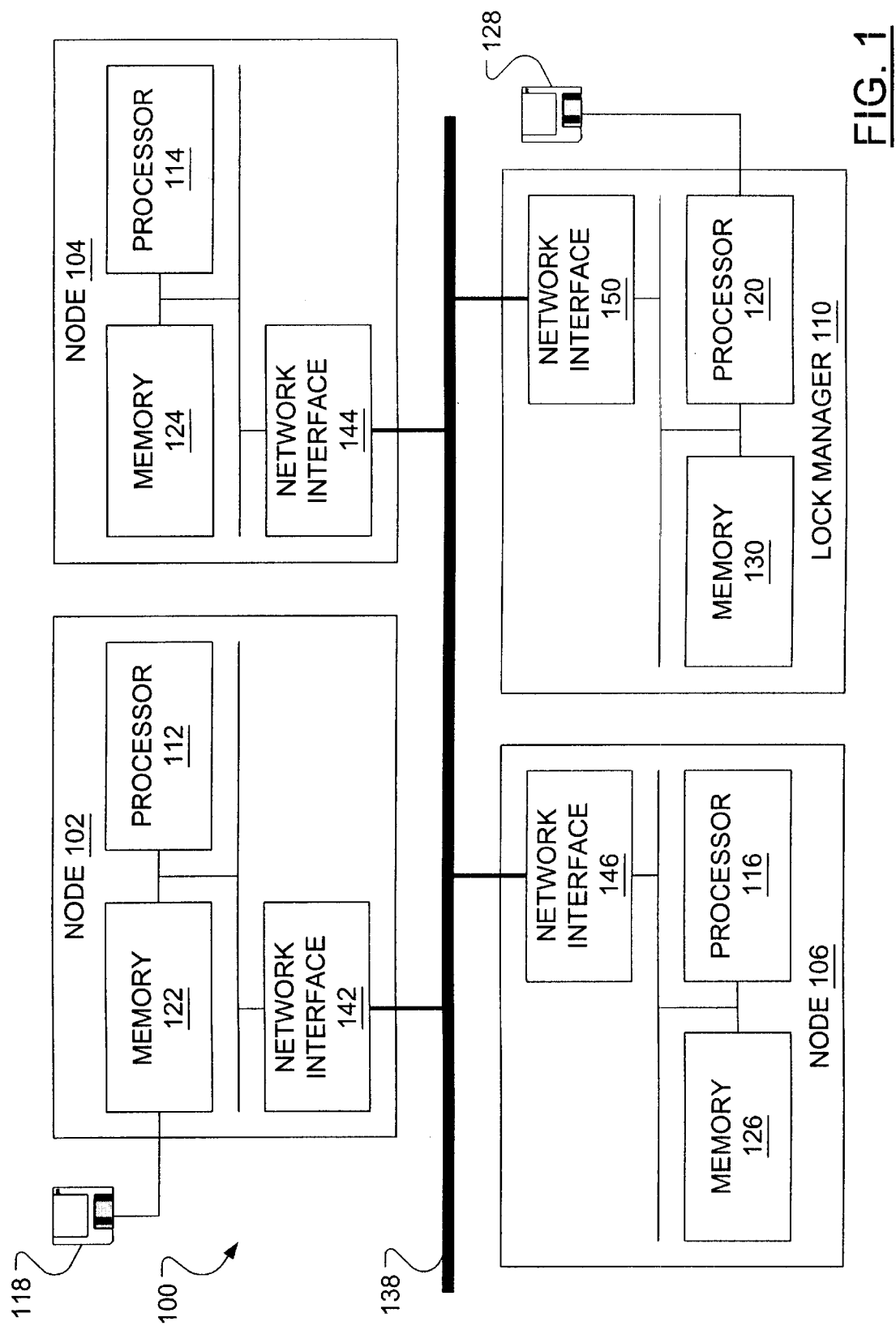
FIG. 1 schematically illustrates a distributed shared memory system.

A variety of memory consistency models have been defined in the context of parallel computing (see, for a survey thereof, S. Adve and K. Gharachorloo, "Shared memory consistency models: A tutorial", *Computer*, vol. 29, no. 12, pp. 66–76, December 1996, the contents of which are incorporated herein by reference). A symmetric shared memory system typically implements sequential consistency, in that updates made by processors are viewed by other processors in exactly the same sequence. This type of consistency may be prohibitively expensive to implement in loosely coupled distributed systems, however, due to the overhead of propagating individual writes and ordering these writes globally. As such, distributed shared memory typically relies on weak consistency models, where memory is consistent only at well-defined points. It has been shown that many parallel applications will function correctly without modification in weak consistency systems. One well known weak consistency memory model is the lazy release consistency (LRC) algorithm, found in TreadMarks (see P. Keleher, A. Cox, S. Sandhya Dwarkadas and Willy Zwaenepoel, "TreadMarks: Distributed Shared Memory on Standard Workstations and Operating Systems", Proceedings of the Winter 1995 USENIX Conference, pp. 115–131, 1994, the contents of which are incorporated herein by reference).

From "TreadMarks: Distributed Shared Memory on Standard Workstations and Operating Systems":

In lazy release consistency (LRC), the propagation of modifications is postponed until the time of the acquire. At this time, the acquiring processor determines which modifications it needs to see according to the definition of RC. To do so, LRC divides the execution of each process into intervals, each denoted by an interval index. Every time a process executes a release or an acquire, a new interval begins and the interval index is incremented. Intervals of different processes are partially ordered: (i) intervals on a single processor are totally ordered by program order, and (ii) an interval on processor p precedes an interval on processor q if the interval of q begins with the acquire corresponding to the release that concluded the interval of p. This partial order can be represented concisely by assigning a vector timestamp to each interval. A vector timestamp contains an entry for each processor. The entry for processor p in the vector timestamp of interval i of processor p is equal to i. The entry for processor $q \neq p$ denotes the most recent interval of processor q that precedes the current interval of processor according to the partial order. A processor computes a new vector timestamp at an acquire according to the pair-wise maximum of its previous vector timestamp and the releaser's vector timestamp.

RC requires that, before a processor may continue past an acquire, the updates of all intervals with a smaller vector timestamp than p's current vector timestamp must be visible at p. Therefore, at an acquire, p sends its current vector timestamp to the previous releaser, q. Processor q then piggybacks on the release-acquire message top, write notices for all intervals named in q's current vector timestamp but not in the vector timestamp it received from p.

A write notice is an indication that a page has been modified in a particular interval, but it does not contain the actual modifications. The timing of the actual data movement depends on whether an invalidate, an update, or a hybrid protocol is used. TreadMarks currently uses an invalidate protocol: the arrival of a write notice for a page causes the processor to invalidate its copy of that page. A subsequent access to that page causes an access miss, at which time the modifications are propagated to the local copy.

Note that a write notice relates to a page, yet a lock relates to an individual unit of shared memory, which may be smaller or larger than a page and may span more than one page. Note also that a lock is a data structure and that a vector timestamp relating to a lock is an indication of the global ordering of access operations (acquire, release) performed on the lock.

Illustrated in FIG. 1 is a reliable distributed shared memory system 100 including four nodes 102, 104, 106, 110 each with a corresponding processor 112, 114, 116, 120 connected to a corresponding memory 122, 124, 126, 130 where both have access to a network 138 through a corresponding network interface 142, 144, 146, 150. One node (110) may act as a lock manager. Note that the memory shown (122, 124, 126, 130) is physical memory and that virtual memory is a portion of the physical memory. Virtual memory is the portion of memory which is of interest to currently running processes and it is virtual memory that is shared in a distributed shared memory system.

In an exemplary manner, processor 112 (of node 102) is shown as loaded with state replicating software for executing a method of this invention from software medium 118. Similarly, processor 120 (of lock manger 110) is shown as loaded with lock management software for executing a method of this invention from software medium 128. Each of software media 118, 128 may be a disk, a tape, a chip or a random access memory containing a file downloaded from a remote source.

Figure 2:
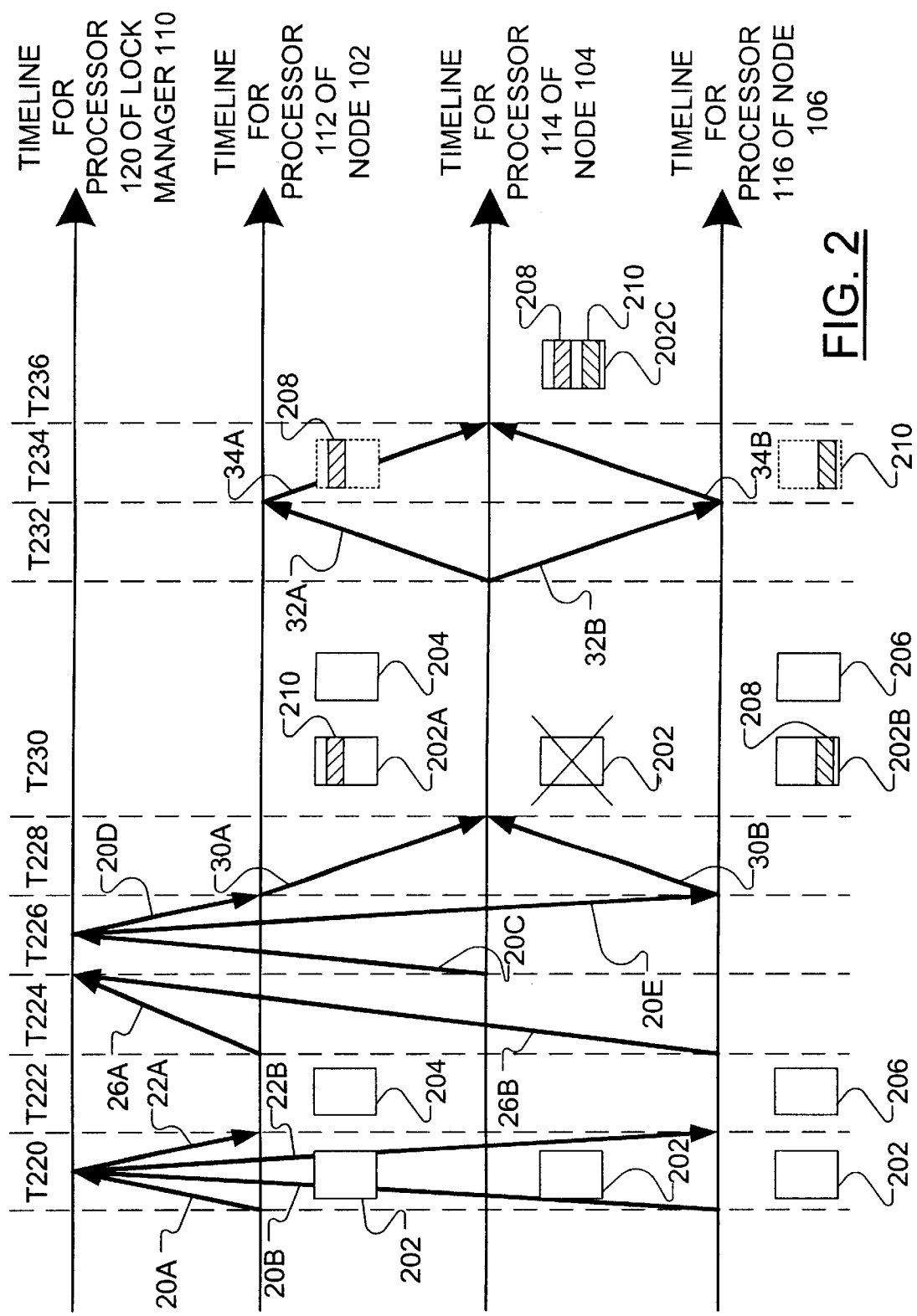
FIG. 2 illustrates chronological operation of the lazy release consistency algorithm.

To illustrate the known LRC algorithm, consider, with reference to FIG. 2, three processors 112, 114, 116 of nodes 102, 104, 106, respectively (FIG. 1) sharing a page 202 of single distributed shared memory 108 (FIG. 1) that contains two units, U1 and U2, each protected by a lock, L1 and L2, respectively. FIG. 2 depicts a sequence of actions taken by the processors. Initially, page 202 is considered valid and write protected at all three processors. All processors can read the units, U1 and U2. Next, at time T220, processor 112 sends a lock acquire request 20A to lock manager 110 and receives a reply 22A through which it acquires lock L1. Roughly at the same time processor 116 acquires lock L2 (through messages 20B and 22B). At time T222, processors 112 and 116 modify the units U1, U2 corresponding to the locks L1, L2. Due to the modifications to the units U1, U2, and since page 202 was initially write protected, a page fault occurs at each processor 112, 116. In response to the page fault, a local copy 204, 206 of page 202 is made in each processor 112, 116. These copies, or twins, 204, 206 can later be used to determine which portions of the page have been modified. Once the copies are made, page 202 may be unprotected at processors 112, 116, allowing reads and writes to proceed. Later, when the processors release the locks, the fact that the page has been modified may be recorded in a write notice.

At time T224, processors 112, 116 release locks L1 and L2 by sending a "lock release request" 26A, 26B to lock manager 110. Any processor then may acquire the locks. At time T226 of the example of FIG. 2, a message 20C, including the current vector timestamp for node 104 and a lock acquire request for each of L1 and L2, is sent from processor 114 to lock manager 110. Lock manager 110 forwards lock acquire request for L1 20D to processor 112 and forwards lock acquire request for L2 20E to processor 116. Processor 112 sends to processor 114 a write notice 30A for page 202 while processor 116 sends to processor 114 a write notice 30B for page 202, both at time T228. The write notices cause the copy of page 202 at processor 114 to be invalidated, as shown at time T230. Also at time T230, note the state of pages 202A (page 202 with a change to unit U1) and 202B (page 202 with a change to unit U2).

When processor 114 subsequently accesses page 202, the invalidity of page 202 is noted. Processor 114 requests "diffs", which record the changes in a page, from processors 112, 116, at time T232 with diff requests 32A, 32B. At time T234, a diff 208 is computed at processor 112 by comparing current copy 202A of page 202 against its twin 204. Similarly, a diff 210 is computed at processor 116 by comparing current copy 202B of page 202 against its twin 206. After diffs 208, 210 have been computed and sent to processor 114 by diff reply messages 34A, 34B, twins 204, 206 can be safely discarded.

At time T236, processor 114 receives diffs 208, 210 and updates page 202 with the modifications made by processors 112 and 116 to result in page 202C. Hence, once processor 114 has received and applied both diffs, there are three different versions of the page. Pages 202A and 202B at processors 112 and 116 respectively, that reflect the changes done to the page locally, and page 202C at processor 114 with an updated status containing changes made by both processors 112 and 116.

In order for this multiple writer algorithm to work, it is assumed that overlapping memory regions (units) are not associated with different locks, since that would cause the diffs to partly relate to the same addresses and the final state of a shared page would depend on the order in which the diffs were applied.

To augment existing distributed shared memory algorithms for building high availability applications, several issues must be addressed, two being the following:

some mechanism must be used to maintain an accurate view as to the set of nodes participating in a reliable distributed shared memory (RDSM); and to achieve fault tolerance, the DSM data structures, namely write notices and diffs, have to be replicated, which involves remote communications every time a processor releases a lock where data has been modified.

To address the first of the above issues, a group communication protocol, such as Isis™ (Stratus Computer of Marlboro, Mass.), Ensemble (Cornell University) or Totem (University of California, Santa Barbara) can be used. The group membership protocol ensures that all correctly functioning nodes in the network share a common view of membership at all times. That is, all nodes agree as to the set of nodes that are in the group. Although group communication protocols may be limited in terms of performance, they need only be invoked when a new node joins a group or when a failure is detected in communicating with an existing node. The group communication system may also be used to recover locks that are in the possession of a failed processor.

In overview, to address the second of the above issues, the present invention may be employed. According to the present invention, following a node releasing a lock, the node sends information, including its current vector timestamp, any write notices generated during the time the lock was held and the diffs corresponding to the write notices, to a secondary node. The secondary node is preferably the one that requires the lock next, but in a case in which no node has yet requested the lock, the secondary node may be the node that last held the lock. The secondary node may keep this information separate from its own private data structures, only accessing it, or making it available to other nodes, if required to due to a failure of the primary node. If a node fails (detected by all nodes simultaneously through the group membership protocol), then all nodes complete a lock release code sequence, and enter a recovery operation. During this recovery operation, all nodes exchange all write notices and corresponding diffs, including backup write notices and diffs held by nodes on behalf of the failed node. After all information has been exchanged, diffs are applied and all nodes may start fresh.

To implement reliable distributed shared memory based on the above lazy release consistency algorithm, we must ensure that all vital data structures are properly replicated at all times. Assuming we use a replication factor of two for tolerating a single point of failure, we may ensure that write notices and their associated diffs are always stored on two nodes, except during the recovery operation when one node fails.

Therefore, the present invention requires that a node, upon releasing a lock, send to at least one other node a vector timestamp related to the lock, any write notices generated while the lock was held and the diffs corresponding to the write notices. This replication, at a secondary node, of the lock information (timestamp, write notices and diffs) provides a back up which allows this information to reach the next node to request the lock, even if the last node to hold the lock fails.

Figure 3:
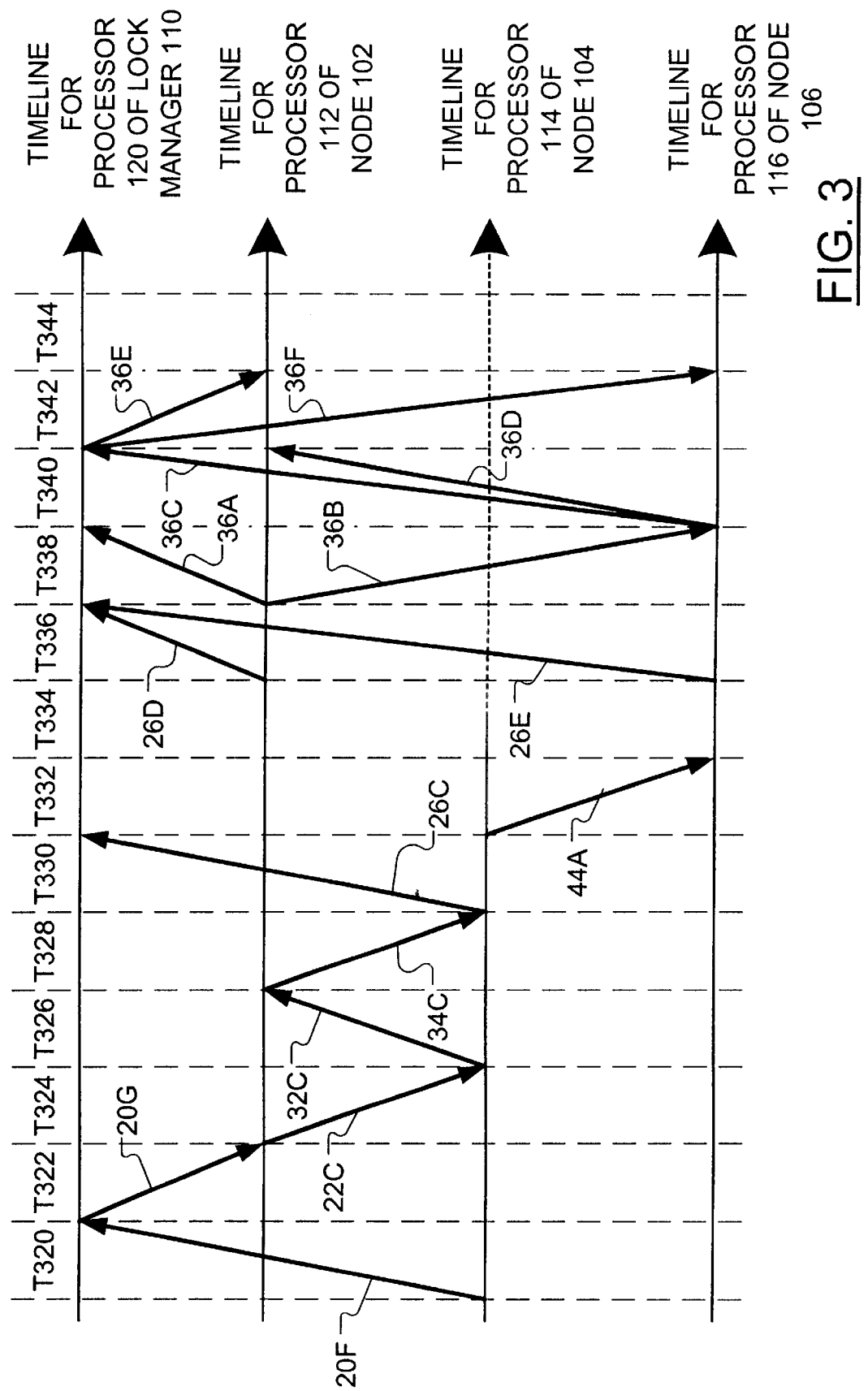
FIG. 3 illustrates chronological operation of the lazy release consistency algorithm with reliability added in accordance with an embodiment of the present invention.

To illustrate a reliable lazy release consistency algorithm, consider, with reference to FIG. 3, processors 112, 114, 116, of nodes 102, 104, 106, respectively (FIG. 1) sharing memory. Each unit of the shared memory is associated with a global lock in such a way that no units overlap. Consider that in advance of time T320 in FIG. 3, processor 112 of node 102 had sent a lock acquire request to manager 110 for a lock L3 on shared memory unit U3 and subsequently had sent a lock release request for lock L3. After completing the lock release request, processor 112 of node 102 had also sent a message (including a vector timestamp, any write notices relating to pages of memory changed while the lock was held and the diffs corresponding to the write notices) to a secondary node (not shown). At time T320, before accessing shared memory unit U3, processor 114 of node 104 sends a lock acquire request 20F for lock L3, to global lock manager 110. Note that lock acquire request 20F includes the current vector timestamp for node 104.

At time T322, global lock manager 110 forwards, in a message 20G, lock acquire request 20F (including the vector timestamp from node 104) to the last node to hold lock L3, node 102, which sends, at time T324, a reply 22C to node 104. Reply 22C includes a write notice relating to the page of memory that includes shared memory unit U3. The page of memory is then invalidated in memory 124 corresponding to processor 114. At time T326, when an application running on processor 114 accesses the page that has been invalidated, the corresponding diff is requested, via diff request 32C, from node 102. Node 102, having the vector timestamp from node 104, computes a diff and replies, at time T328, with diff reply message 34C, and the diff is applied to update the page.

At time T330, after completing access to unit of shared memory U3, node 104 sends to lock manager 110 a lock release request 26C (including updated vector timestamp) for lock L3. Further, processor 114 computes a write notice for this release operation and any necessary diffs. Node 104 then, at time T332, sends a replication message 44A (including vector timestamp, write notice and diffs) to node 106.

Consider a situation illustrated at time T334 wherein node 104 fails. Through the group membership protocol, nodes 102 and 106 and lock manager 110 learn of the failure. At time T336, upon learning of the failure, nodes 102 and 106 enter a failure recovery phase. Initially, nodes 102 and 106 release any currently held locks with lock release requests 26D, 26E. Each of nodes 102 and 106 also compute write notices and corresponding diffs and send a replication message to a secondary node (not shown). Subsequently, at time T338, node 102 sends all currently held vector timestamps, write notices and diffs to all nodes in the group via failure messages 36A, 36B. At time T340, node 106 sends all currently held vector timestamps, write notices and diffs to all nodes in the group via failure messages 36C, 36D. At time T342, lock manager 110 sends all currently held vector timestamps, write notices and diffs to all nodes in the group via failure messages 36E, 36F. Once all nodes have send and received all vector timestamps, write notices and diffs, i.e. at time T344, each node may apply the diffs and update the shared memory to a condition common to all other nodes. Note that, after completion of failure recovery, the shared memory includes changes made by node 104, because node 106 had received a replication message 44A from node 104 before its failure.

Figure 4:
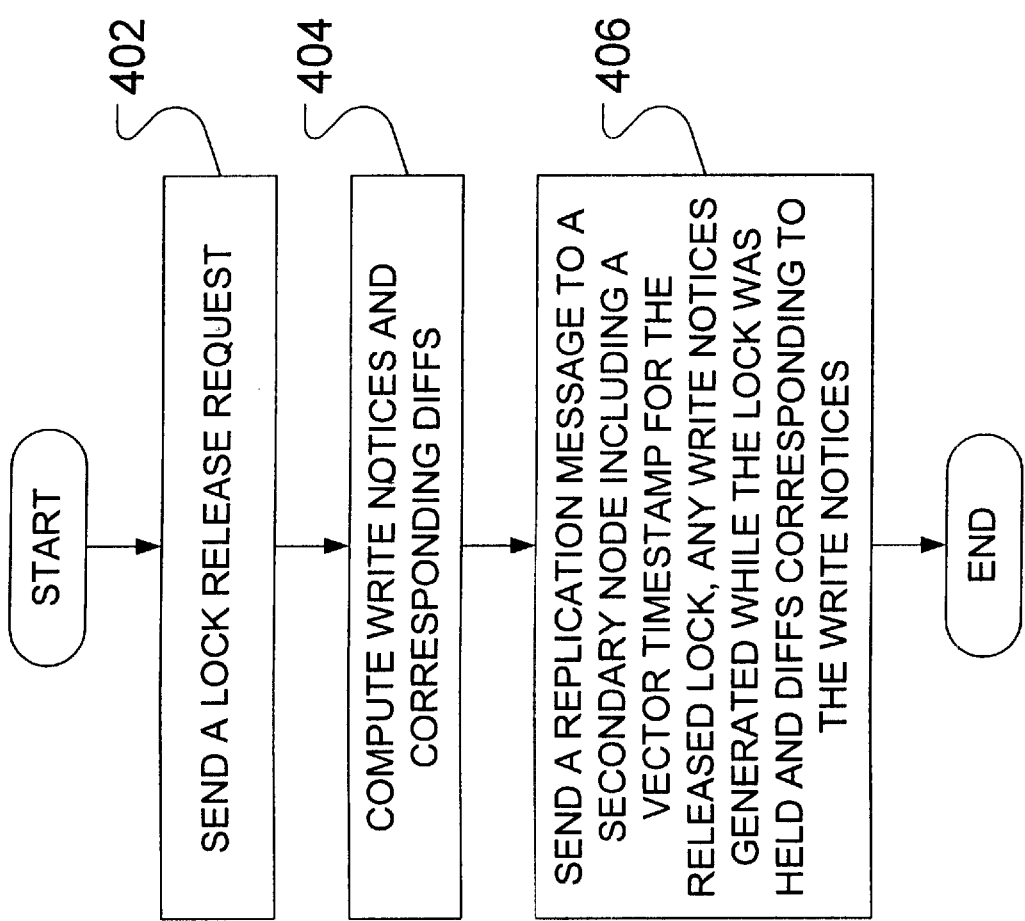
FIG. 4 illustrates, in a flow diagram, lock releasing method steps followed by a node in an embodiment of the invention.

The actions of a node upon the release of a lock may be summarized with reference to FIG. 4. The release of the lock (step 402) comprises sending a lock release request to the current lock manager. Subsequent to the release of the lock, the node computes write notices and corresponding diffs (step 404). A replication message including information relating to the lock is then sent to secondary node (step 406). This information includes a vector timestamp, write notices and diffs corresponding to the write notices.

Figure 5:
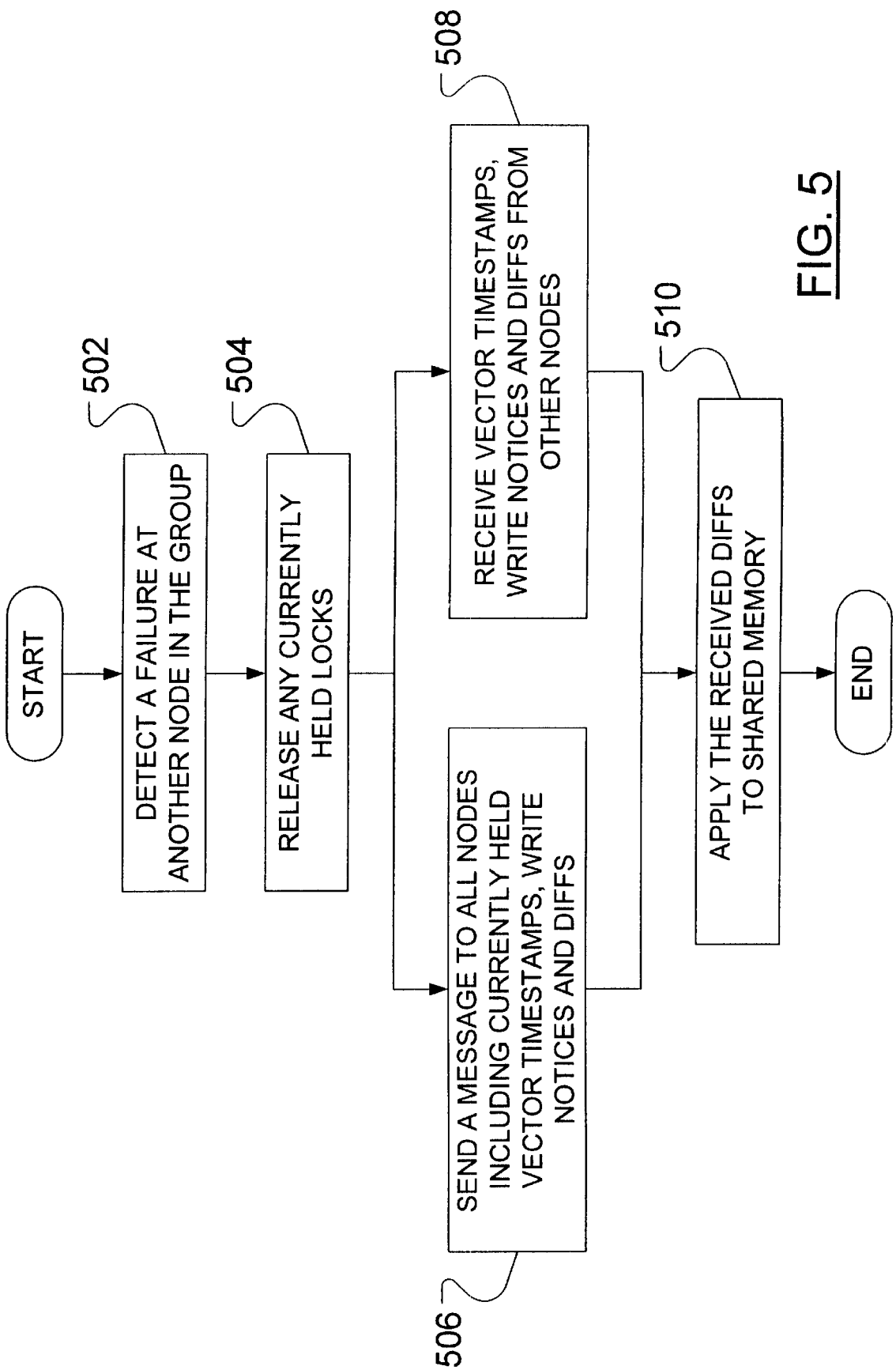
FIG. 5 illustrates, in a flow diagram, failure recovery method steps followed by a node in an embodiment of the invention.

The actions of all nodes in a group performed in response to a failure of a node in the group are outlined in FIG. 5. It is via a group membership protocol that the nodes detect a failure of a node in the group (step 502). Upon detection of this failure, all nodes release their currently held locks (step 504) following the procedure outlined in FIG. 4. The nodes then enter a failure recovery phase. The failure recovery phase includes sending a message (step 506) that includes vector timestamps, write notices and corresponding diffs held on behalf of other nodes to all other nodes in the group. Consequently, the failure recovery phase also includes receiving such messages (step 508) from other nodes in the group. After all the information has been exchanged, the diffs are applied (step 510) and the shared memory may be considered to be as it was before the failure.

Figure 6:
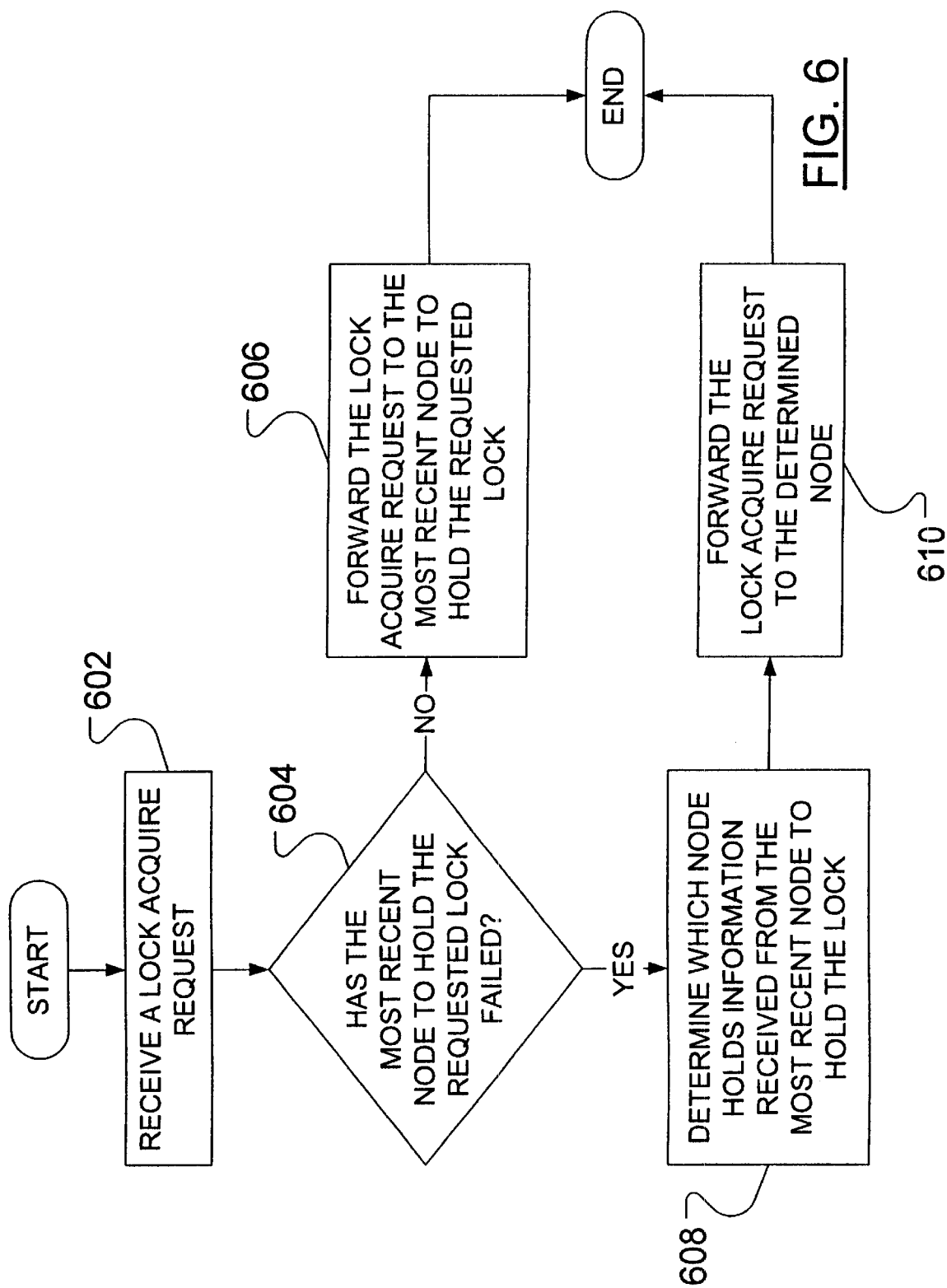
FIG. 6 illustrates, in a flow diagram, lock acquire request forwarding method steps followed by a lock manager in an embodiment of the invention.

An alternative to the failure recovery phase approach is outlined in FIG. 6. In this alternate approach, upon receiving a lock acquire request (step 602), a lock manager determines the status of the last node to hold the requested lock (step 604) through the use of a group membership protocol. If the last node to hold the requested lock has not failed, the lock acquire request is forwarded, as is known, to that node (step 606) such that the requesting node may be provided with write notices. If the last node to hold the requested lock has failed (after having released the lock), the lock manager polls the nodes in the group to determine the identity of a node that holds information replicated from the last node to hold the requested lock (step 608). Once the node holding the replicated information is identified, the lock acquire request is forwarded to that node (step 610) such that the requesting node may be provided with the necessary write notices.

Figure 7:
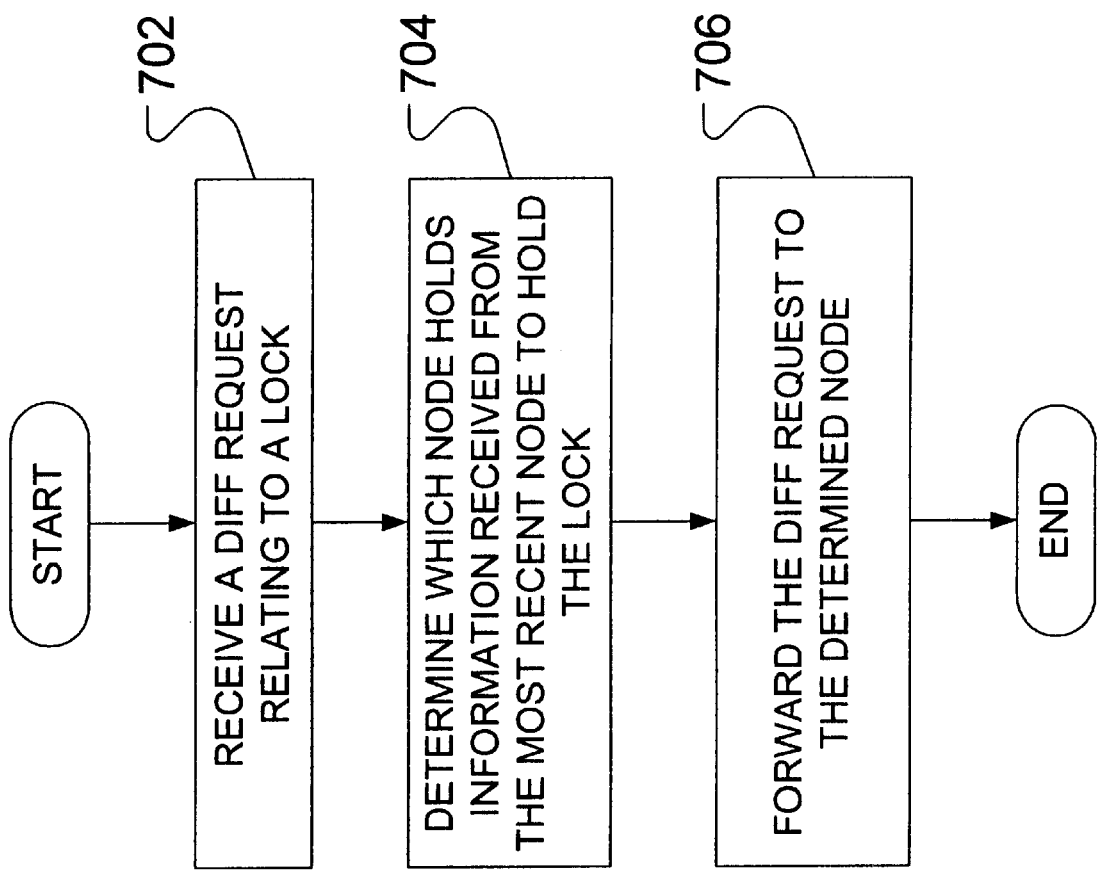
FIG. 7 illustrates, in a flow diagram, diff request forwarding method steps followed by a lock manager in an embodiment of the invention.

It may be the case that a last node to hold a requested lock fails between the time at which it supplied write notices to a lock acquiring node and the time at which the lock acquiring node requests the corresponding diffs. In such a case, a lock acquiring node, knowing of the failure of the last node to hold the requested lock through the group membership protocol, may send the diff request to the lock manager. Turning to FIG. 7, the lock manager receives the diff request (step 702). The lock manger may then poll, as above, the other nodes in the group to determine the identity of a node that holds information replicated from the last node to hold the requested lock (step 704). Once the node holding the replicated information is identified, the diff request may be forwarded to that node (step 706).

Whichever group membership protocol is used, if the lock manager fails, the failure is detected and another node in the group becomes lock manager. Subsequently, upon receiving a lock request, this new lock manager polls each node for the one that last held the lock to which the request relates.

Note that, after acquiring a lock, a process running on a node may freeze or otherwise fail and thus fail to release the lock. A properly configured lock manager may maintain a counter relating to each lock such that after a process freezes, a "time out" may occur. Such a time out may be flagged to the group membership protocol as a failure of the node with the frozen process. As the node has failed without releasing the lock, a replication message has not been sent to a secondary node. Consequently, when recovering from the failure, nodes in the group can only recover information replicated when the lock was last released, thus any changes made to shared memory by the frozen process may be lost.

As will be apparent to a person skilled in the art, a replication factor of greater than two may be used. Such a strategy would increase the reliability of a distributed shared memory system, at the cost of increased data traffic. With a replication factor greater than two, there will be more than one node holding information replicated from the last node to hold the requested lock. The lock manager need only determine one.

It is possible to also base reliable distributed shared memory on types of weak consistency algorithms other than lazy consistency, in particular, entry consistency (see B. Bershad, M. Zekauskas, and W. Sawdon, "The Midway Distributed Shared Memory System", Proceedings of COMPCOM '93, pp. 528–537, February, 1993, incorporated herein by reference).

Other modifications will be apparent to those skilled in the art and, therefore, the invention is defined in the claims.

We claim:

1. At a first node in a distributed shared memory system, said system implemented using the lazy release consistency protocol, a method of replicating state comprising:
   completing access to a synchronization variable;
   after completing said access, sending a message to a second node, said message comprising:
      an indication of a global ordering of access to said synchronization variable;
      an indication that a page of shared memory has undergone a modification, said page of shared memory including memory referenced by said synchronization variable; and
      a record of said modification.

2. The method of claim 1 wherein said synchronization variable is a lock on a unit of shared memory and said access completing comprises releasing said lock.

3. At a first node in a distributed shared memory system, said system implemented using a weak consistency protocol, a method of replicating state comprising:
   releasing a lock on a unit of shared memory;
   after releasing said lock, sending a message to a second node, said message comprising:
     a vector timestamp;
     a write notice indicating that a page of shared memory underwent a modification while said lock was held; and
     a record of said modification.

4. A method for synchronization variable managing in a distributed shared memory system, said system implemented using a weak consistency protocol, said method comprising:
   receiving an access request related to a synchronization variable, where said synchronization variable is for a unit of shared memory;
   determining a most recent node to have held said synchronization variable;
   if said most recent node to have held said synchronization variable has failed, and said failure has occurred subsequent to sending a replication message,
     determining a node possessed of said replication message, said replication message including an indication of a global ordering of access to said synchronization variable, an indication that a page has undergone a modification while said synchronization variable was held, said page of shared memory including memory referenced by said synchronization variable, and a record of said modification; and
     forwarding said access request to said node determined to be possessed of said replication message.

5. The method of claim 4 wherein said access request is a request to acquire said synchronization variable.

6. The method of claim 4 wherein said access request is a for a record of a modification undergone while said synchronization variable was held.

7. The method of claim 4 wherein said determining a node possessed of said replication message comprises polling nodes for possession of said replication message.

8. At a node acting as a synchronization variable manager in a distributed shared memory system, said system implemented using a weak consistency protocol, a processor operable to:
   receive an access request related to a synchronization variable, where said synchronization variable is for a unit of shared memory;
   determine a most recent node to have held said synchronization variable;
   if said most recent node to have held said synchronization variable has failed, and said failure has occurred subsequent to sending a replication message,
     determine a node possessed of said replication message, said replication message including an indication of a global ordering of access to said synchronization variable, an indication that a page has undergone a modification while said synchronization variable was held, said page of shared memory including memory referenced by said synchronization variable, and a record of said modification; and
     forward said access request to said node determined to be possessed of said replication message.

9. A computer readable medium for providing program control to a processor, said processor included in a node acting as a synchronization variable manager in a distributed shared memory system, said system implemented using a weak consistency protocol, said computer readable medium adapting said processor to be operable to:
   receive an access request related to a synchronization variable, where said synchronization variable is for a unit of shared memory;
   determine a most recent node to have held said synchronization variable;
   if said most recent node to have held said synchronization variable has failed, and said failure has occurred subsequent to sending a replication message,
     determine a node possessed of said replication message, said replication message including an indication of a global ordering of access to said synchronization variable, an indication that a page has undergone a modification while said synchronization variable was held, said page of shared memory including memory referenced by said synchronization variable, and a record of said modification; and
     forward said access request to said node determined to be possessed of said replication message.

10. At a first node in a group of nodes in a distributed shared memory system, said system implemented using a weak consistency protocol, a method of recovering from a failure of a second node in said group, said method comprising:
   detecting, via a group membership protocol, said failure in said second node;
   releasing each currently held synchronization variable;
   waiting for each currently held synchronization variable to be released or expire;
   entering a recovery operation, wherein said recovery operation comprises:
     sending, to all nodes in said group, an indication of a global ordering of access to each said synchronization variable along with an indication of each page that has undergone a modification while one said synchronization variable was held, and a record of said modification;
     receiving from other nodes in said group a plurality of indications of global ordering of access to each said synchronization variable currently held by other nodes, each said indication of global ordering sent with an indication of each page that has undergone a modification while one said synchronization variable was held, and a record of said modification; and
     subsequent to completion of said sending and receiving, applying each said received record to a shared memory.

* * * * *